(12) United States Patent
Nagata et al.

(10) Patent No.: US 7,660,375 B2
(45) Date of Patent: Feb. 9, 2010

(54) RECEIVING DEVICE

(75) Inventors: Hidenari Nagata, Kawasaki (JP); Hideo Ohwada, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 558 days.

(21) Appl. No.: 11/362,090

(22) Filed: Feb. 27, 2006

(65) Prior Publication Data
US 2006/0274867 A1  Dec. 7, 2006

(30) Foreign Application Priority Data

Jun. 3, 2005  (JP)  .............................. 2005-163464
Jul. 29, 2005 (JP)  .............................. 2005-221935

(51) Int. Cl.
*H04L 1/02* (2006.01)
*H04B 7/10* (2006.01)

(52) U.S. Cl. .................... 375/347; 375/267; 375/316; 455/132

(58) Field of Classification Search ................. 375/347, 375/267, 316; 455/132
See application file for complete search history.

(56) References Cited

U.S. PATENT DOCUMENTS

| | | | |
|---|---|---|---|
| 5,781,592 A | 7/1998 | Masuda | |
| 6,738,439 B1 | 5/2004 | Okanoue et al. | |
| 6,792,258 B1 | 9/2004 | Nokes et al. | |
| 7,231,178 B2 * | 6/2007 | Friedman et al. | 455/12.1 |
| 7,366,246 B2 * | 4/2008 | Walker et al. | 375/262 |
| 2002/0193146 A1 | 12/2002 | Wallace et al. | |
| 2003/0199246 A1 | 10/2003 | Friedman et al. | |
| 2004/0072546 A1 | 4/2004 | Sugar et al. | |
| 2004/0142669 A1 | 7/2004 | Vogt et al. | |
| 2005/0113143 A1 | 5/2005 | Oiwa | |

FOREIGN PATENT DOCUMENTS

| | | |
|---|---|---|
| CN | 1132012 A | 9/1996 |
| EP | 0967746 | 12/1999 |
| JP | 04-142120 A | 5/1992 |
| JP | 04-157931 A | 5/1992 |
| JP | 07-177504 A | 7/1995 |
| JP | 2004-112155 | 4/2004 |
| JP | 2004-120144 A | 4/2004 |
| JP | 2004-214894 A | 7/2004 |
| JP | 2004-312333 | 11/2004 |
| JP | 2005-045508 A | 2/2005 |
| TW | 583860 B | 4/2004 |
| TW | 233275 B | 5/2005 |
| WO | WO 02/11297 | 2/2002 |

OTHER PUBLICATIONS

European Search Report dated Apr. 21, 2009, 10 pages.
Taiwanese Office Action, dated Jul. 16, 2009, 7 pages.

* cited by examiner

*Primary Examiner*—Ted M Wang
(74) *Attorney, Agent, or Firm*—Arent Fox LLP

(57) ABSTRACT

By including plural receiving branches which are independently controllable for use in diversity reception or plural-channel simultaneous reception, a receiving device can be operated both as a diversity receiving device and as a plural-channel simultaneous receiving device.

18 Claims, 10 Drawing Sheets

RECEIVING DEVICE

CROSS-REFERENCE TO RELATED APPLICATIONS

This application is based upon and claims the benefit of priority from the prior Japanese Patent Application Nos. 2005-163464, filed on Jun. 3, 2005, and 2005-221935, filed on Jul. 29, 2005, the entire contents of which are incorporated herein by reference.

BACKGROUND OF THE INVENTION

1. Field of the Invention

The present invention relates to a receiving device including plural receiving branches.

2. Description of the Related Art

FIG. 10 is a circuit diagram of an example of a conventional receiving device. This receiving device is a diversity receiving device for OFDM (Orthogonal Frequency Division Multiplexing) signals and includes two receiving branches 10 and 20.

In the receiving branch 10, numeral 11 denotes an antenna, numeral 12 denotes a tuner which performs station selection and frequency conversion of a received signal, and numeral 13 denotes a demodulation circuit which receives an output signal of the tuner 12, performs processing such as A/D (analog/digital) conversion, orthogonal demodulation, or Fourier transform, and outputs a demodulated signal D1.

In the receiving branch 20, numeral 21 denotes an antenna, numeral 22 denotes a tuner which performs station selection and frequency conversion of a received signal, and numeral 23 denotes a demodulation circuit which receives an output signal of the tuner 22, performs processing such as A/D conversion, orthogonal demodulation, or Fourier transform, and outputs a demodulated signal D2.

Numeral 30 denotes a signal combining circuit which combines the demodulated signal D1 of the receiving branch 10 outputted by the demodulation circuit 13 and the demodulated signal D2 of the receiving branch 20 outputted by the demodulation circuit 23 by maximum ratio combining or the like and outputs a combined demodulated signal D3.

Numeral 40 denotes a decoding block which receives the combined demodulated signal D3 outputted by the signal combining circuit 30, performs processing such as demapping or deinterleave, and outputs a decoded signal D4 being an encoded data stream (for example, an MPEG stream).

Numeral 50 denotes a decoder (for example, an MPEG decoder) which receives the decoded signal D4 outputted by the decoding block 40 and performs decoding corresponding to an encoding format of the decoded signal D4. Numeral 60 denotes an output device (a monitor, a recording device, or the like) to which a decoded signal (a picture signal, an audio signal) outputted by the decoder 50 is given.

(Patent Document 1)

Japanese Patent Application Laid-open No. 2004-312333

(Patent Document 2)

Japanese Patent Application Laid-open No. 2004-112155

The conventional receiving device shown in FIG. 10 has a problem that although it can perform diversity reception, it cannot perform signal regeneration of plural channels simultaneously, and hence cannot meet multifunctionality such as multi-audio recording, multi-picture recording, or multi-screen.

SUMMARY OF THE INVENTION

An object of the present invention is to provide a receiving device which can be operated both as a diversity receiving device and as a plural-channel simultaneous receiving device and can meet multifunctionality such as multi-audio recording, multi-picture recording, or multi-screen.

A receiving device of the present invention comprises plural receiving branches which are controllable for use in diversity reception or plural-channel simultaneous reception.

DETAILED DESCRIPTION OF THE PREFERRED EMBODIMENTS

Embodiments of the present invention will be described below based on the drawings.

First Embodiment

Figure 1:
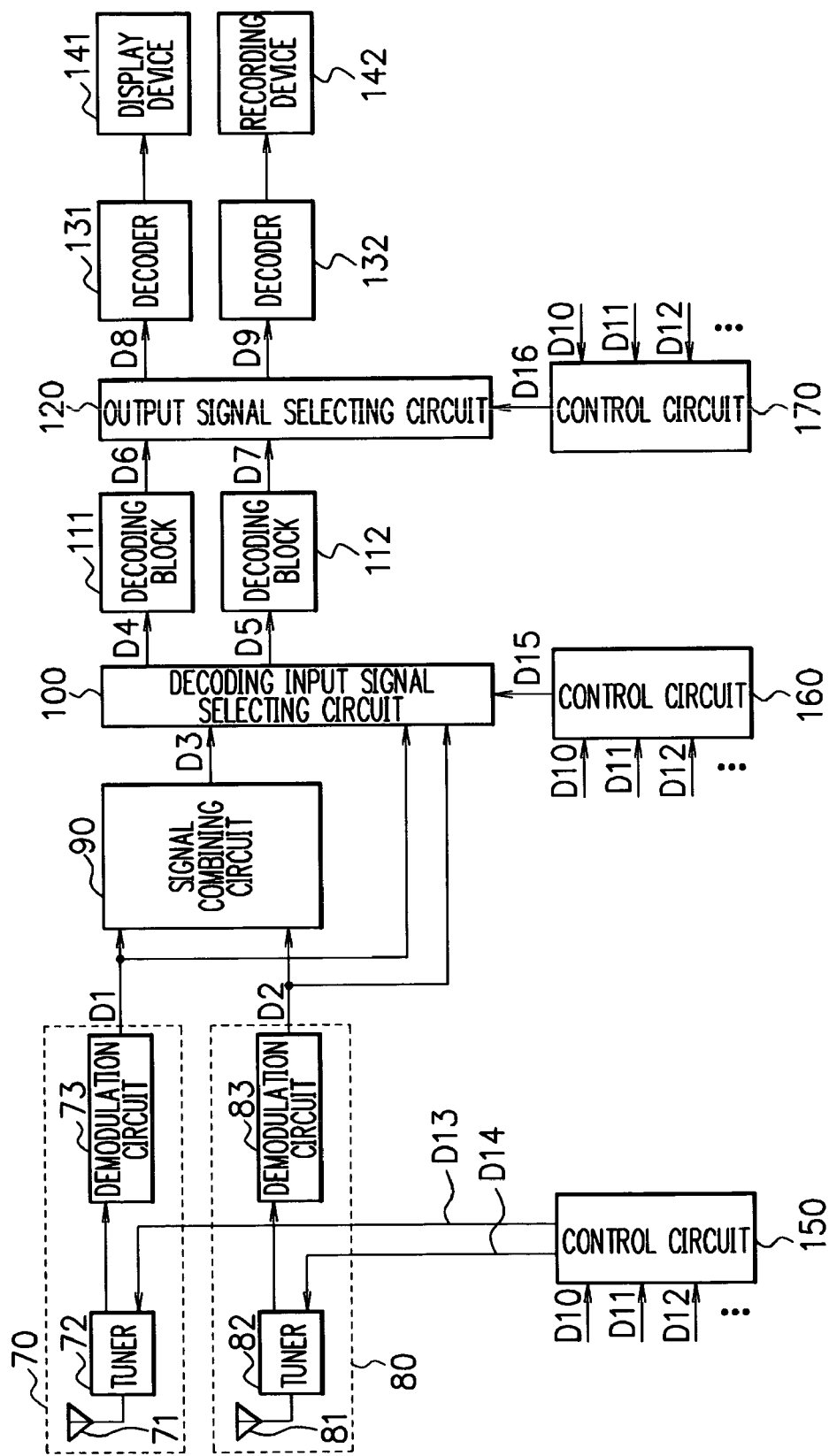
FIG. 1 is a block diagram showing a configuration example of a receiving device according to a first embodiment of the present invention.

FIG. 1 is a block diagram showing a configuration example of a receiving device according to a first embodiment of the present invention. The receiving device according to the first embodiment is a receiving device for OFDM signals and includes two receiving branches 70 and 80.

In the receiving branch 70, numeral 71 denotes an antenna, numeral 72 denotes a tuner which performs station selection and frequency conversion of a received signal, and numeral 73 denotes a demodulation circuit which receives an output signal of the tuner 72, performs processing such as A/D conversion, orthogonal demodulation, or Fourier transform, and outputs a demodulated signal D1.

In the receiving branch 80, numeral 81 denotes an antenna, numeral 82 denotes a tuner which performs station selection and frequency conversion of a received signal, and numeral 83 denotes a demodulation circuit which receives an output signal of the tuner 82, performs processing such as A/D conversion, orthogonal demodulation, or Fourier transform, and outputs a demodulated signal D2.

Numeral 90 denotes a signal combining circuit which combines the demodulated signal D1 of the receiving branch 70 outputted by the demodulation circuit 73 and the demodulated signal D2 of the receiving branch 80 outputted by the demodulation circuit 83 by maximum ratio combining or the like and outputs a combined demodulated signal D3.

Numeral 100 denotes a decoding input signal selecting circuit which receives the combined demodulated signal D3 outputted by the signal combining circuit 90, the demodulated signal D1 outputted by the demodulation circuit 73, and the demodulated signal D2 outputted by the demodulation circuit 83 and selects a decoding input signal to be inputted to a next-stage decoding block. In this embodiment, the decoding input signal selecting circuit 100 can select the combined demodulated signal D3 outputted by the signal combining circuit 90 or the demodulated signals D1 and D2 outputted by the demodulation circuits 73 and 83.

Numeral 111 denotes a decoding block which receives a decoding input signal D4 outputted by the decoding input signal selecting circuit 100, performs processing such as demapping or deinterleave, and outputs a decoded signal D6 being an encoded data stream (for example, an MPEG stream).

Numeral 112 denotes a decoding block which receives a decoding input signal D5 outputted by the decoding input signal selecting circuit 100, performs processing such as demapping or deinterleave, and outputs a decoded signal D7 being an encoded data stream (for example, an MPEG stream).

Numeral 120 denotes an output signal selecting circuit which receives the decoded signals D6 and D7 outputted by the decoding blocks 111 and 112 and selects a decoded signal to be outputted to a next-stage decoder. In this embodiment, the output signal selecting circuit 120 can select the decoded signal D6 outputted by the decoding block 111 or the decoded signals D6 and D7 outputted by the decoding blocks 111 and 112.

Incidentally, the output signal selecting circuit 120 can perform selection control for outputting the decoded signal D6 as either of output signals D8 and D9 when selecting only the decoded signal D6, and perform selection control for outputting each of the decoded signals D6 and D7 as either of the output signals D8 and D9 when selecting the decoded signals D6 and D7.

Numeral 131 denotes a decoder (for example, an MPEG decoder) which receives the output signal D8 of the output signal selecting circuit 120 and performs decoding corresponding to an encoding format of the output signal D8. Numeral 132 denotes a decoder (for example, an MPEG decoder) which receives the output signal D9 of the output signal selecting circuit 120 and performs decoding corresponding to an encoding format of the output signal D9.

Numeral 141 denotes a display device being an output device to which a decoded signal (a picture signal, an audio signal) outputted by the decoder 131 is supplied. Numeral 142 denotes a recording device being an output device to which a decoded signal (a picture signal, an audio signal) outputted by the decoder 132 is supplied.

Numeral 150 denotes a control circuit which with, out of a receiving state signal D10 indicating a receiving state (a noise state), an AGC level signal D11 indicating an AGC (automatic gain control) level, a user switching signal D12 by a user's channel switching request, and an error rate signal indicating an error rate, one or more signals, for example, the receiving state signal D10, the AGC level signal D11, and the user switching signal D12 as judgment signals, supplies station selection control signals D13 and D14 to the tuners 72 and 82 to control station selection operations of the tuners 72 and 82.

Numeral 160 denotes a control circuit which with one or more signals, for example, the receiving state signal D10, the AGC level signal D11, and the user switching signal D12 out of the receiving state signal D10, the AGC signal D11, the user switching signal D12, and the error rate signal as judgment signals, supplies a decoding input signal selection control signal D15 to the decoding input signal selecting circuit 100 to control a decoding input signal selection operation of the decoding input signal selecting circuit 100.

Numeral 170 denotes a control circuit which with one or more signals, for example, the receiving state signal D10, the AGC level signal D11, and the user switching signal D12 out of the receiving state signal D10, the AGC level signal D11, the user switching signal D12, and the error rate signal as judgment signals, supplies an output signal selection control signal D16 to the output signal selecting circuit 120 to control an output signal selection operation of the output signal selecting circuit 120.

In the first embodiment of the present invention thus configured, when control is performed in such a manner that the receiving branches 70 and 80 obtain demodulated signals of the same channel, the decoding input signal selecting circuit 100 selects only the combined demodulated signal D3 outputted by the signal combining circuit 90 as the decoding input signal D4, and the output signal selecting circuit 120 selects the decoded signal D6 outputted by the decoding block 111 as the output signal D8, it is possible to use the receiving branches 70 and 80 for diversity reception, operate the receiving device according to the first embodiment as a diversity receiving device, and display the contents received by the receiving branches 70 and 80 on the display device 141.

Incidentally, in this case, when control is performed in such a manner that the output signal selecting circuit 120 selects the decoded signal D6 outputted by the decoding block 111 as the output signal D9, the contents received by the receiving branches 70 and 80 can be recorded on the recording device 142.

In contrast, when control is performed in such a manner that the receiving branches 70 and 80 obtain demodulated signals of different channels, the decoding input signal selecting circuit 100 selects the demodulated signals D1 and D2 outputted by the demodulation circuits 73 and 83 as the decoding input signals D4 and D5, and the output signal selecting circuit 120 selects the decoded signals D6 and D7 outputted by the decoding blocks 111 and 112 as the output signals D8 and D9, it is possible to use the receiving branches 70 and 80 for 2-channel simultaneous reception, operate the receiving device according to the first embodiment as a 2-channel simultaneous receiving device, display the contents received by the receiving branch 70 on the display device 141, and record the contents received by the receiving branch 80 on the recording device 142.

In this case, the operation mode can be switched by the control circuits 150, 160, and 170 in such a manner that priority is given to a receiving channel by the receiving branch 70 out of the receiving branches 70 and 80, and when the noise state of the receiving branch 70 is not good, the receiving branch 80 also obtains demodulated signals of the same channel as the receiving branch 70 so that the receiving device according to the first embodiment operates as the diversity receiving device including the two receiving branches 70 and 80.

Incidentally, for example, when the recording device is used instead of the display device 141, multi-audio recording or multi-picture recording can be performed. Moreover, for example, when an output of the decoder 132 is also given to the display device 141, a multi-screen can be displayed.

As described above, the first embodiment of the present invention includes two receiving branches 70 and 80 which are controllable for use in diversity reception or 2-channel simultaneous reception, so that it can be operated both as a diversity receiving device and as a 2-channel simultaneous receiving device and can meet multifunctionality such as multi-audio recording, multi-picture recording, or multi-screen.

Second Embodiment

Next, a second embodiment of the present invention will be described.

Figure 2:
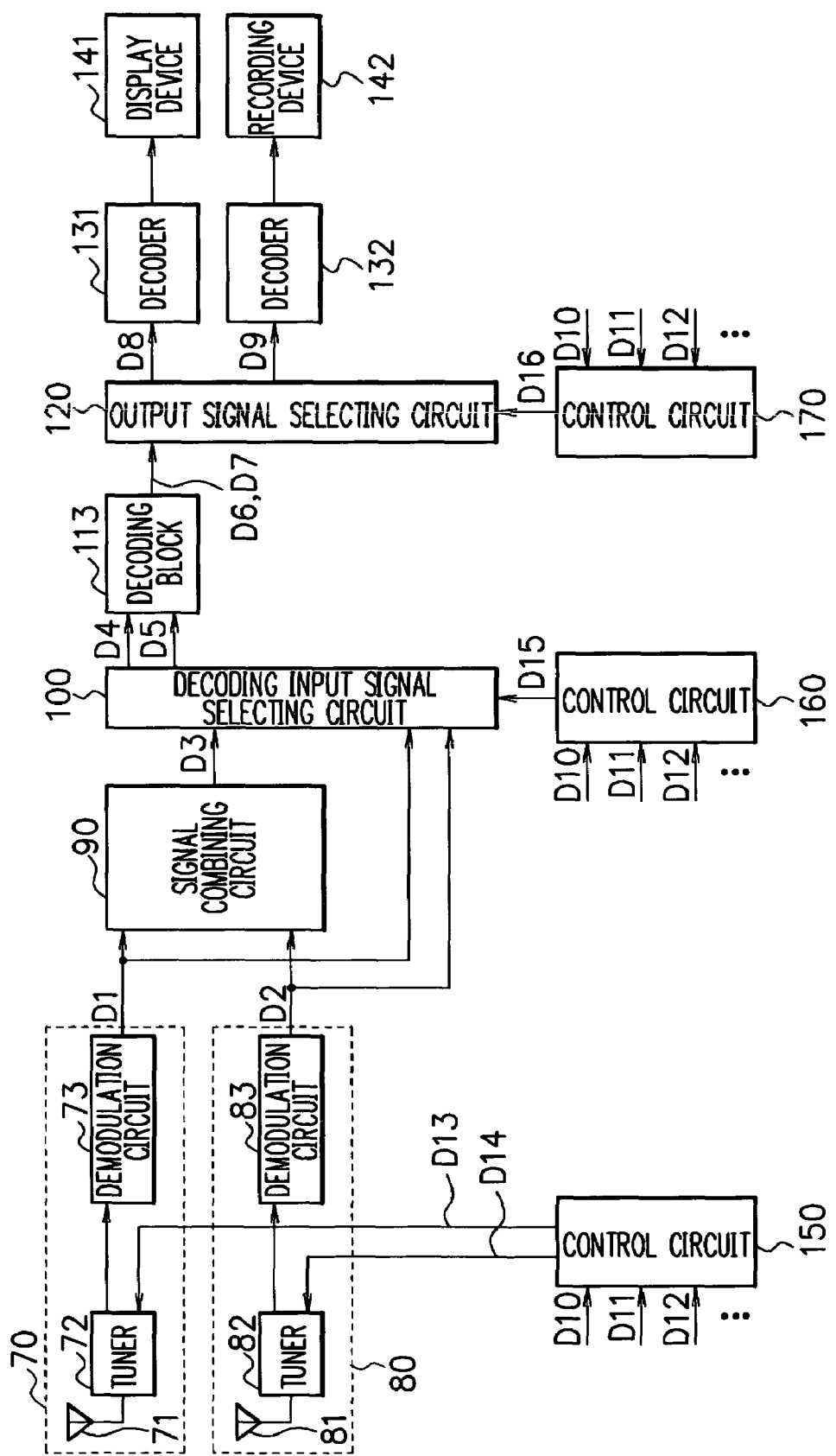
FIG. 2 is a block diagram showing a configuration example of a receiving device according to a second embodiment of the present invention.

FIG. 2 is a block diagram showing a configuration example of a receiving device according to the second embodiment of the present invention. The receiving device according to the second embodiment is provided with a decoding block 113 having a different function in place of the decoding blocks 111 and 112 shown in FIG. 1, and in other respects, it is configured in the same manner as the first embodiment of the present invention shown in FIG. 1.

The decoding block 113 is controlled to operate at the same speed as the decoding blocks 111 and 112 shown in FIG. 1, receive the decoding input signal D4, perform processing such as demapping or deinterleave, and output the decoded signal D6 when the decoding input signal selecting circuit 100 outputs only the decoding input signal D4. The decoding block 113 is controlled to operate at twice the speed of the decoding blocks 111 and 112 shown in FIG. 1, receive the decoding input signals D4 and D5, perform processing such as demapping or deinterleave in a time-sharing system, and output the decoded signals D6 and D7 when the decoding input signal selecting circuit 100 outputs the decoding input signals D4 and D5.

Similarly to the first embodiment of the present invention, the second embodiment of the present invention also includes two receiving branches 70 and 80 which are controllable for use in diversity reception or 2-channel simultaneous reception, so that it can be operated both as a diversity receiving device and as a 2-channel simultaneous receiving device and can meet multifunctionality such as multi-audio recording, multi-picture recording, or multi-screen.

Third Embodiment

Next, a third embodiment of the present invention will be described.

Figure 3:
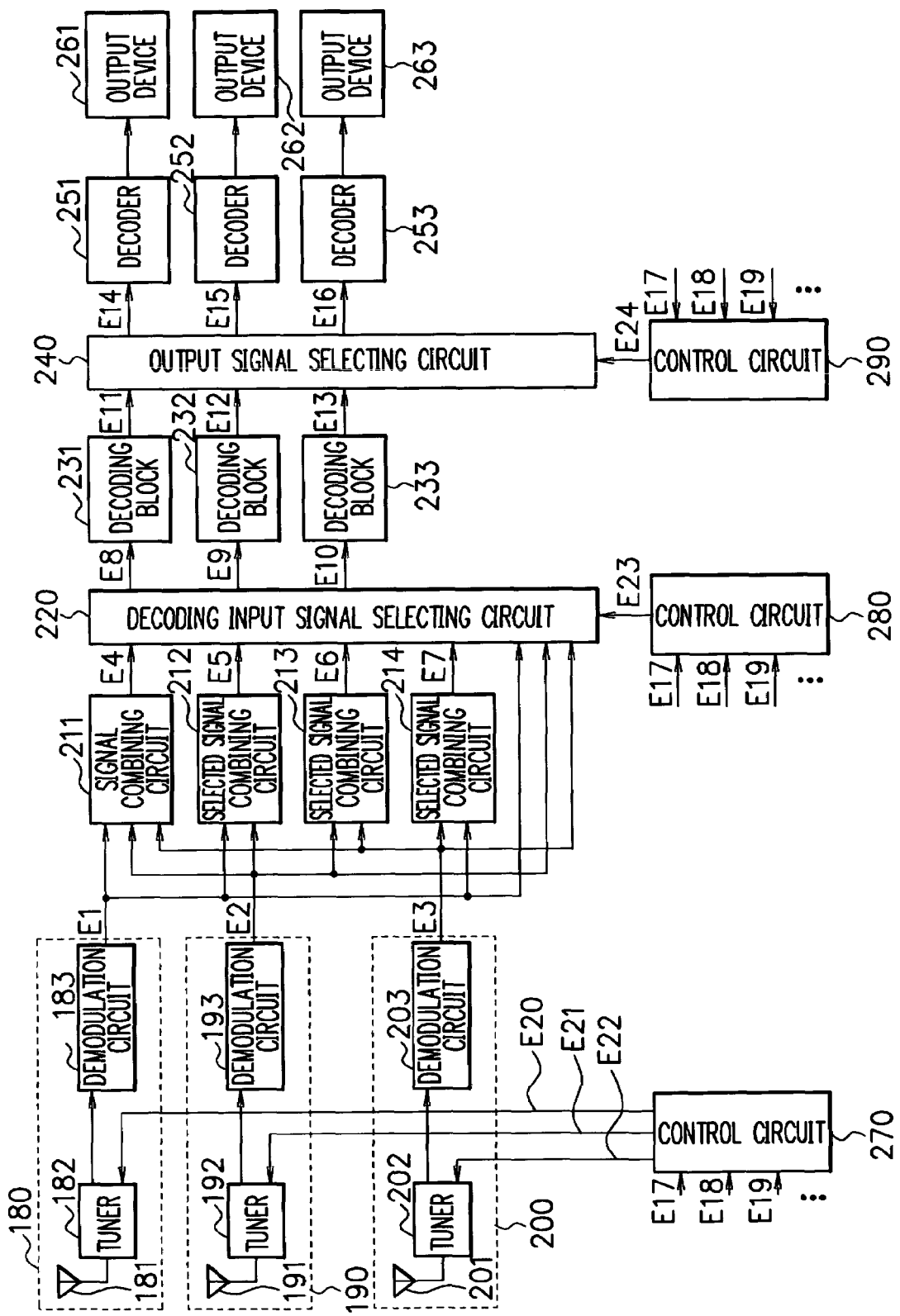
FIG. 3 is a block diagram showing a configuration example of a receiving device according to a third embodiment of the present invention.

FIG. 3 is a block diagram showing a configuration example of a receiving device according to the third embodiment of the present invention. The receiving device according to the third embodiment is a receiving device for OFDM modulated signals and includes three receiving branches 180, 190, and 200.

In the receiving branch 180, numeral 181 denotes an antenna, numeral 182 denotes a tuner which performs station selection and frequency conversion of a received signal, and numeral 183 denotes a demodulation circuit which performs processing such as A/D conversion, orthogonal demodulation, or Fourier transform of an output signal of the tuner 182 and outputs a demodulated signal E1.

In the receiving branch 190, numeral 191 denotes an antenna, numeral 192 denotes a tuner which performs station selection and frequency conversion of a received signal, and numeral 193 denotes a demodulation circuit which performs processing such as A/D conversion, orthogonal demodulation, or Fourier transform of an output signal of the tuner 192 and outputs a demodulated signal E2.

In the receiving branch 200, numeral 201 denotes an antenna, numeral 202 denotes a tuner which performs station selection and frequency conversion of a received signal, and numeral 203 denotes a demodulation circuit which performs processing such as A/D conversion, orthogonal demodulation, or Fourier transform of an output signal of the tuner 202 and outputs a demodulated signal E3.

Numeral 211 denotes a signal combining circuit which combines the demodulated signal E1 of the receiving branch 180 outputted by the demodulation circuit 183, the demodulated signal E2 of the receiving branch 190 outputted by the demodulation circuit 193, and the demodulated signal E3 of the receiving branch 200 outputted by the demodulation circuit 203 by maximum ratio combining or the like and outputs a combined demodulated signal E4.

Numeral 212 denotes a selected signal combining circuit which selects the demodulated signal E1 of the receiving branch 180 outputted by the demodulation circuit 183 and the demodulated signal E2 of the receiving branch 190 outputted by the demodulation circuit 193, combines them by maximum ratio combining or the like, and outputs a combined demodulated signal E5.

Numeral 213 denotes a selected signal combining circuit which selects the demodulated signal E2 of the receiving branch 190 outputted by the demodulation circuit 193 and the demodulated signal E3 of the receiving branch 200 outputted by the demodulation circuit 203, combines them by maximum ratio combining or the like, and outputs a combined demodulated signal E6.

Numeral 214 denotes a selected signal combining circuit which selects the demodulated signal E3 of the receiving branch 200 outputted by the demodulation circuit 203 and the demodulated signal E1 of the receiving branch 180 outputted by the demodulation circuit 183, combines them by maximum ratio combining or the like, and outputs a combined demodulated signal E7.

Incidentally, the selected signal combining circuits 212, 213, and 214 may be configured to be controllable in such a manner as to be able to receive the demodulated signals E1, E2, and E3 outputted by the demodulation circuits 183, 193, and 203 and select two desired demodulated signals out of these demodulated signals E1, E2, and E3.

Numeral 220 denotes a decoding input signal selecting circuit which receives the combined demodulated signal E4 outputted by the signal combining circuit 211, the combined demodulated signals E5, E6, and E7 outputted by the selected signal combining circuits 212, 213, and 214, and the demodulated signals E1, E2, and E3 outputted by the demodulation circuits 183, 193, and 203, and selects a decoding input signal to be inputted to a next-stage decoding block. In this embodiment, one to three demodulated signals can be selected.

Numeral 231 denotes a decoding block which receives a decoding input signal E8 outputted by the decoding input signal selecting circuit 220, performs processing such as demapping or deinterleave, and outputs a decoded signal E11 being an encoded data stream (for example, an MPEG stream).

Numeral 232 denotes a decoding block which receives of a decoding input signal E9 outputted by the decoding input signal selecting circuit 220, performs processing such as demapping or deinterleave, and outputs a decoded signal E12 being an encoded data stream (for example, an MPEG stream).

Numeral 233 denotes a decoding block which receives a decoding input signal E10 outputted by the decoding input signal selecting circuit 220, performs processing such as demapping or deinterleave, and outputs a decoded signal E13 being an encoded data stream (for example, an MPEG stream).

Numeral 240 denotes an output signal selecting circuit which receives the decoded signals E11, E12, and E13 outputted by the decoding blocks 231, 232, and 233 and selects a decoded signal to be outputted to a next-stage decoder. In this embodiment, one to three decoded signals can be selected.

Incidentally, the output signal selecting circuit 240 can perform selection control for outputting the decoded signal E11 as any of output signals E14, E15, and E16 when only the decoded signal E11 is selected, selection control for outputting each of the decoded signals E11 and E12 as any of the output signals E14, E15, and E16 when the decoded signals E11 and E12 are selected, and selection control for outputting each of the decoded signals E11, E12, and E13 as any of the output signals E14, E15, and E16 when the decoded signals E11, E12, and E13 are selected.

Numeral 251 denotes a decoder which receives the output signal E14 outputted by the output signal selecting circuit 240 and performs decoding corresponding to an encoding format of the output signal E14. Numeral 252 denotes a decoder which receives the output signal E15 outputted by the output signal selecting circuit 240 and performs decoding corresponding to an encoding format of the output signal E15. Numeral 253 denotes a decoder which receives the output signal E16 outputted by the output signal selecting circuit 240 and performs decoding corresponding to an encoding format of the output signal E16. Incidentally, the decoders 251, 252, and 253 are, for example, MPEG decoders.

Numeral 261 denotes an output device such as a display device or a recording device to which a decoded signal (a picture signal, an audio signal) outputted by the decoder 251 is supplied. Numeral 262 denotes an output device such as a display device or a recording device to which a decoded signal (a picture signal, an audio signal) outputted by the decoder 252 is supplied. Numeral 263 denotes an output device such as a display device or a recording device to which a decoded signal (a picture signal, an audio signal) outputted by the decoder 253 is supplied.

Numeral 270 denotes a control circuit which with, out of a receiving state signal E17 indicating a receiving state (a noise state), an AGC level signal E18 indicating an AGC level, a user switching signal E19 by a user's channel switching request, and an error rate signal indicating an error rate, one or more signals, for example, the receiving state signal E17, the AGC level signal E18, and the user switching signal E19 as judgment signals, supplies station selection control signals E20, E21, and E22 to the tuners 182, 192 and 202, respectively, to control station selection operations of the tuners 182, 192 and 202.

Numeral 280 denotes a control circuit which with one or more signals, for example, the receiving state signal E17, the AGC level signal E18, and the user switching signal E19 out of the receiving state signal E17, the AGC level signal E18, the user switching signal E19, and the error rate signal as judgment signals, supplies a decoding input signal selection control signal E23 to the decoding input signal selecting circuit 220 to control a decoding input signal selection operation of the decoding input signal selecting circuit 220.

Numeral 290 denotes a control circuit which with one or more signals, for example, the receiving state signal E17, the AGC level signal E18, and the user switching signal E19 out of the receiving state signal E17, the AGC level signal E18, the user switching signal E19, and the error rate signal as judgment signals, supplies an output signal selection control signal E24 to the output signal selecting circuit 240 to control an output signal selection operation of the output signal selecting circuit 240.

In the third embodiment of the present invention thus configured, for example, when control is performed in such a manner that the receiving branches 180, 190, and 200 obtain demodulated signals of the same channel, the decoding input signal selecting circuit 220 selects the combined demodulated signal E4 outputted by the signal combining circuit 211 as the decoding input signal E8, and the output signal selecting circuit 240 selects the decoded signal E11 outputted by the decoding block 231 as the output signal E14, the receiving device can be operated as a diversity receiving device including three receiving branches.

In contrast, for example, when control is performed in such a manner that the receiving branches 180 and 190 obtain demodulated signals of the same channel, the decoding input signal selecting circuit 220 selects the combined demodulated signal E5 outputted by the selected signal combining circuit 212 as the decoding input signal E8, and the output signal selecting circuit 240 selects the decoded signal E11 outputted by the decoding block 231 as the output signal E14, the receiving device can be operated as a diversity receiving device including two receiving branches.

Further, for example, when control is performed in such a manner that the receiving branches 190 and 200 obtain demodulated signals of the same channel, the decoding input signal selecting circuit 220 selects the combined demodulated signal E6 outputted by the selected signal combining circuit 213 as the decoding input signal E8, and the output signal selecting circuit 240 selects the decoded signal E11 outputted by the decoding block 231 as the output signal E14, the receiving device can be operated as a diversity receiving device including two receiving branches.

Furthermore, for example, when control is performed in such a manner that the receiving branches 180 and 200 obtain demodulated signals of the same channel, the decoding input signal selecting circuit 220 selects the combined demodulated signal E7 outputted by the selected signal combining circuit 214 as the decoding input signal E8, and the output signal selecting circuit 240 selects the decoded signal E11 outputted by the decoding block 231 as the output signal E14, the receiving device can be operated as a diversity receiving device including two receiving branches.

Moreover, for example, when control is performed in such a manner that the receiving branches 180 and 190 obtain demodulated signals of the same channel, the receiving branch 200 obtains a demodulated signal of a channel different from that of the receiving branches 180 and 190, the decoding input signal selecting circuit 220 selects the combined demodulated signal E5 outputted by the selected signal combining circuit 212 and the demodulated signal E3 outputted by the receiving branch 200 as the decoding input signals E8 and E9, and the output signal selecting circuit 240 selects the decoded signals E11 and E12 outputted by the decoding blocks 231 and 232 as the output signals E14 and E15, the receiving device can be operated as a 2-channel simultaneous receiving device, and as concerns one received signal, a diversity reception effect can be obtained.

In this case, the operation mode can be switched by control by the control circuits 270, 280, and 290 in such a manner that priority is given to the receiving channel by the receiving branches 180 and 190, and when the noise states of the receiving branches 180 and 190 are not good, the receiving branch 200 also obtains a demodulated signal of the same channel as the receiving branches 180 and 190 so that the receiving device operates as a diversity receiving device including three receiving branches.

Further, for example, when control is performed in such a manner that the receiving branches 190 and 200 obtain demodulated signals of the same channel, the receiving branch 180 obtains a demodulated signal of a channel different from that of the receiving branches 190 and 200, the decoding input signal selecting circuit 220 selects the combined demodulated signal E6 outputted by the selected signal combining circuit 213 and the demodulated signal E1 outputted by the receiving branch 180 as the decoding input signals E8 and E9, and the output signal selecting circuit 240 selects the decoded signals E11 and E12 outputted by the decoding blocks 231 and 232 as the output signals E14 and E15, the receiving device can be operated as a 2-channel simultaneous receiving device, and as concerns one received signal, a diversity reception effect can be obtained.

In this case, the operation mode can be switched by control by the control circuits 270, 280, and 290 in such a manner that priority is given to the receiving channel by the receiving branches 190 and 200, and when the noise states of the receiving branches 190 and 200 are not good, the receiving branch 180 also obtains a demodulated signal of the same channel as the receiving branches 190 and 200 so that the receiving device operates as a diversity receiving device including three receiving branches.

Furthermore, for example, when control is performed in such a manner that the receiving branches 180 and 200 obtain demodulated signals of the same channel, the receiving branch 190 obtains a demodulated signal of a channel different from that of the receiving branches 180 and 200, the decoding input signal selecting circuit 220 selects the combined demodulated signal E7 outputted by the selected signal combining circuit 214 and the demodulated signal E2 outputted by the receiving branch 190 as the decoding input signals E8 and E9, and the output signal selecting circuit 240 selects the decoded signals E11 and E12 outputted by the decoding blocks 231 and 232 as the output signals E14 and E15, the receiving device can be operated as a 2-channel simultaneous receiving device, and as concerns one received signal, a diversity reception effect can be obtained.

In this case, the operation mode can be switched by control by the control circuits 270, 280, and 290 in such a manner that priority is given to the receiving channel by the receiving branches 180 and 200, and when the noise states of the receiving branches 180 and 200 are not good, the receiving branch 190 also obtains a demodulated signal of the same channel as the receiving branches 180 and 200 so that the receiving device operates as a diversity receiving device including three receiving branches.

Moreover, for example, when control is performed in such a manner that the receiving branches 180, 190, and 200 obtain demodulated signals of different channels, the decoding input signal selecting circuit 220 selects the demodulated signals E1, E2, and E3 outputted by the demodulation circuits 183, 193, and 203 as the decoding input signals E8, E9, and E10, and the output signal selecting circuit 240 selects the decoded signals E11, E12, and E13 outputted by the decoding blocks 231, 232, and 233, the receiving device can be operated as a 3-channel simultaneous receiving device including three receiving branches.

In this case, the operation mode can be switched by control by the control circuits 270, 280, and 290 in such a manner that priority is given to the receiving channel by the receiving branch 180, and when the noise state of the receiving branch 180 is not good, the receiving branch 190 or the receiving branches 190 and 200 also obtain a demodulated signal or demodulated signals of the same channel as the receiving branch 180 so that the receiving device operates as a diversity receiving device including two or three receiving branches.

As described above, the third embodiment of the present invention includes three receiving branches 180, 190, and 200 which are controllable for use in diversity reception or 2-channel simultaneous reception or 3-channel simultaneous reception, so that it can be operated as a diversity receiving device, as a 2-channel simultaneous receiving device, and as a 3-channel simultaneous receiving device, and can meet multifunctionality such as multi-audio recording, multi-picture recording, or multi-screen.

Fourth Embodiment

Next, a fourth embodiment of the present invention will be described.

Figure 4:
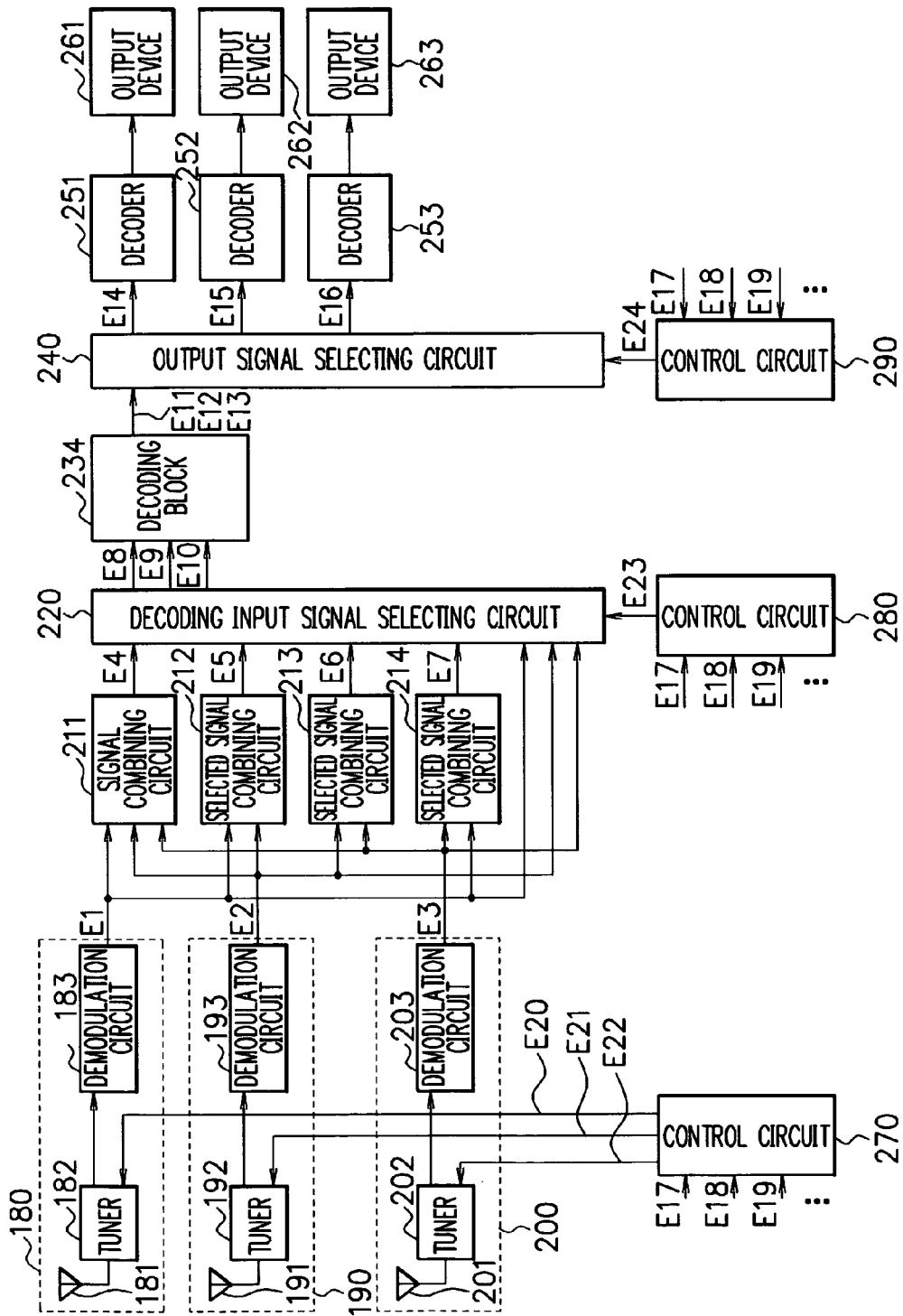
FIG. 4 is a block diagram showing a configuration example of a receiving device according to a fourth embodiment of the present invention.

FIG. 4 is a block diagram showing a configuration example of a receiving device according to the fourth embodiment of the present invention. The receiving device according to the fourth embodiment is provided with a decoding block 234 having a different function in place of the decoding blocks 231 to 233 shown in FIG. 3, and in other respects, it is configured in the same manner as the third embodiment of the present invention shown in FIG. 3.

When the decoding input signal selecting circuit 220 outputs only the decoding input signal E8, the decoding block 234 is controlled to operate at the same speed as the decoding blocks 231 to 233 shown in FIG. 3, receive the decoding input signal E8, perform processing such as demapping or deinterleave, and output the decoded signal E11. When the decoding input signal selecting circuit 220 outputs only the decoding input signals E8 and E9, the decoding block 234 is controlled to operate at twice the speed of the decoding blocks 231 to 233 shown in FIG. 3, receive the decoding input signals E8 and E9, perform processing such as demapping or deinterleave in a time-sharing system, and output the decoded signals E11 and E12. When the decoding input signal selecting circuit 220 outputs the decoding input signals E8, E9, and E10, the decoding block 234 is controlled to operate at three times the speed of the decoding blocks 231 to 233 shown in FIG. 3, receive the decoding input signals E8, E9, and E10, perform processing such as demapping or deinterleave in the time-sharing system, and output the decoded signals E11, E12, and E13.

Similarly to the third embodiment of the present invention, the fourth embodiment of the present invention also includes three receiving branches 180, 190, and 200 which are controllable for use in diversity reception or 2-channel simultaneous reception or 3-channel simultaneous reception, so that it can be operated as a diversity receiving device, as a 2-channel simultaneous receiving device, and as a 3-channel simultaneous receiving device, and can meet multifunctionality such as multi-audio recording, multi-picture recording, or multi-screen.

Incidentally, the case where the two receiving branches 70 and 80 are provided is described in the first and second embodiments, and the case where the three receiving branches 180, 190, and 200 are provided is described in the third and fourth embodiments, but the present invention is also applicable to a case where four or more receiving branches are provided.

Fifth Embodiment

Next, a fifth embodiment of the present invention will be described.

Figure 5:
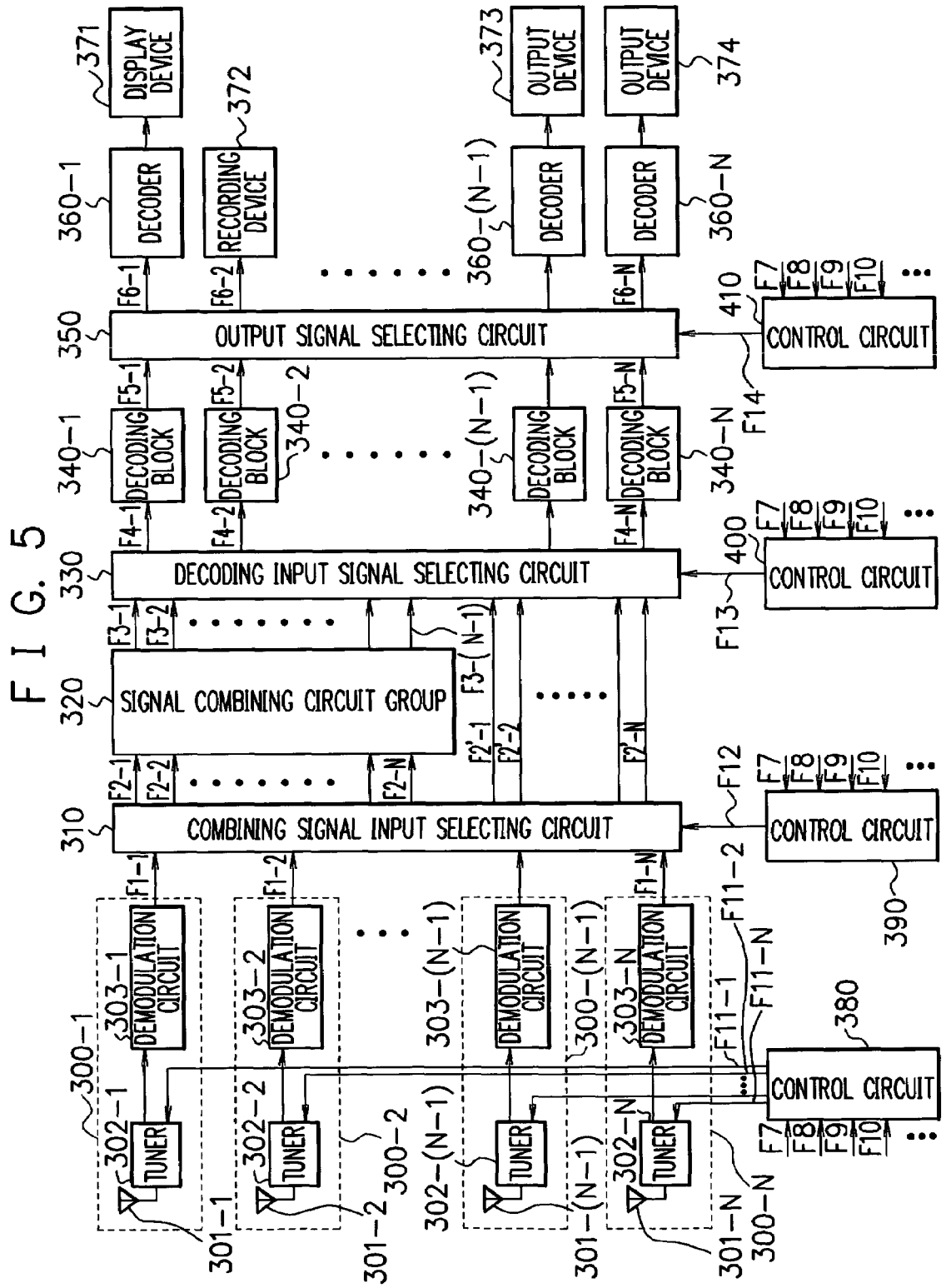
FIG. 5 is a block diagram showing a configuration example of a receiving device according to a fifth embodiment of the present invention.

FIG. 5 is a block diagram showing a configuration example of a receiving device according to the fifth embodiment of the present invention. The receiving device according to the fifth embodiment is a receiving device for OFDM modulated signals and includes plural receiving branches 300-$i$. Note that i is a subscript, and i is an integer from 1 to N (N is any integer of 2 or more) (This is the same in the following description).

In the receiving branch 300-$i$, numeral 301-$i$ denotes an antenna, numeral 302-$i$ denotes a tuner which performs station selection and frequency conversion of a received signal. Numeral 303-$i$ denotes a demodulation circuit which receives an output signal of the corresponding tuner 302-$i$, performs processing such as A/D conversion, orthogonal demodulation, or Fourier transform, and outputs a demodulated signal F1-$i$.

Numeral 310 denotes a combining signal input selecting circuit which receives the demodulated signals F1-$i$ of the receiving branches 300-$i$ outputted by the demodulation circuits 303-$i$ and selects demodulated signals F2-$i$ to be inputted to a next-stage signal combining circuit group 320 and demodulated signals F2'-$i$ to be inputted to a next-stage decoding input signal selecting circuit 330. Namely, the combining signal input selecting circuit 310 switches transmission paths of the demodulated signals F1-$i$ of the receiving branches 300-$i$ outputted by the demodulation circuits 303-$i$ to control selection of the receiving branches 300-$i$ whose demodulated signals F1-$i$ are combined, the receiving branches 300-$i$ whose demodulated signals F1-$i$ are not combined, lines of the receiving branches 300-$i$ whose demodulated signals F1-$i$ are combined, and so on by the next-stage signal combining circuit group 320.

Numeral 320 denotes a signal combining circuit group which outputs combined demodulated signals F3-$j$ by combining the demodulated signals F2-$i$ outputted by the combining signal input selecting circuit 310. The signal combining circuit group 320 is composed of plural signal combining circuits, each combining inputted two signals by maximum ratio combining or the like and outputting a combined signal. Incidentally, j is a subscript, and j is an integer from 1 to (N−1).

Numeral 330 denotes a decoding input signal selecting circuit which receives the combined demodulated signals F3-$j$ outputted by the signal combining circuit group 320 and the demodulated signals F2'-$i$ outputted by the combining signal input selecting circuit 310 and selects a decoding input signal to be inputted to a next-stage decoding block. In this embodiment, the decoding input signal selecting circuit 330 can select one to N demodulated signals.

Numeral 340-$i$ denotes a decoding block which receives a decoding input signal F4-$i$ outputted by the decoding input signal selecting circuit 330, performs processing such as demapping or deinterleave, and outputs a decoded signal F5-$i$ being an encoded data stream (for example, an MPEG stream). In the receiving device of this embodiment, the number of demodulated signals obtained by reception is N, which is the same as the number of the receiving branches 300-$i$, at the maximum, and hence it is recommended to provide N decoding blocks 340-$i$.

Numeral 350 is an output signal selecting circuit which receives the decoded signals F5-$i$ outputted by the decoding blocks 340-$i$ and selects a decoded signal to be inputted to a next-stage decoder or the like. In this embodiment, the output signal selecting circuit 350 can select one to N decoded signals. Incidentally, when selecting the decoded signal F5-$i$, the output signal selecting circuit 350 can perform selection control for outputting this decoded signal F5-$i$ as any of output signals F6-$i$.

Numeral 360-$i$ denotes a decoder (for example, an MPEG decoder) which each receives the output signal F6-$i$ of the output signal selecting circuit 350 and performs decoding corresponding to an encoding format of the output signal F6-$i$. Numeral 371 denotes an output device such as a display device, a recording device (a picture recording device or a sound recording device) to which a decoded signal (a picture signal, an audio signal) outputted by a decoder 360-1 is supplied. Numeral 372 denotes an output device such as a recording device to which data decoded by the decoding block as an output signal F6-2 outputted by the output signal selecting circuit 350 is supplied as it is. Numerals 373 and 374 are output devices such as a display device and a recording device to which decoded signals (a picture signal, an audio signal) outputted by decoders 360-(N−1) and 360-N are supplied. Incidentally, as an example of the output device, FIG. 5 shows numeral 371 as a display device and numeral 372 as a recording device.

Numeral 380 denotes a control circuit which based on inputted judgment signals, supplies station selection control signals F11-$i$ to their corresponding tuners 302-$i$ to control station selection operations of the tuners 302-$i$.

Numeral 390 denotes a control circuit which based on inputted judgment signals, supplies a demodulated signal selection control signal F12 to the combining signal input selecting circuit 310 to control a demodulated signal selection operation of the combining signal input selecting circuit 310.

Numeral 400 denotes a control circuit which based on inputted judgment signals, supplies a decoding input signal selection control signal F13 to the decoding input signal selecting circuit 330 to control a decoding input signal selection operation of the decoding input signal selecting circuit 330.

Numeral 410 denotes a control circuit which based on inputted judgment signals, supplies an output signal selection control signal F14 to the output signal selecting circuit 350 to control an output signal selection operation of the output signal selection circuit 350.

Here, the control circuits 380, 390, 400, and 410 can each perform control with, out of an error rate signal F7 indicating an error rate related to the received signal, an AGC level signal F8 indicating an AGC level, a priority signal F9 indicating which of the output devices connected at a subsequent stage priority is given to, that is, an order of priority of the output device, a user switching signal F10 according to a user's channel switching request, and a receiving state signal indicating a receiving state (a noise state), one or more signals, for example, the error rate signal F7, the AGC level signal F8, the priority signal F9, and the user switching signal F10 as the judgment signals, and perform control independently.

Figure 6:
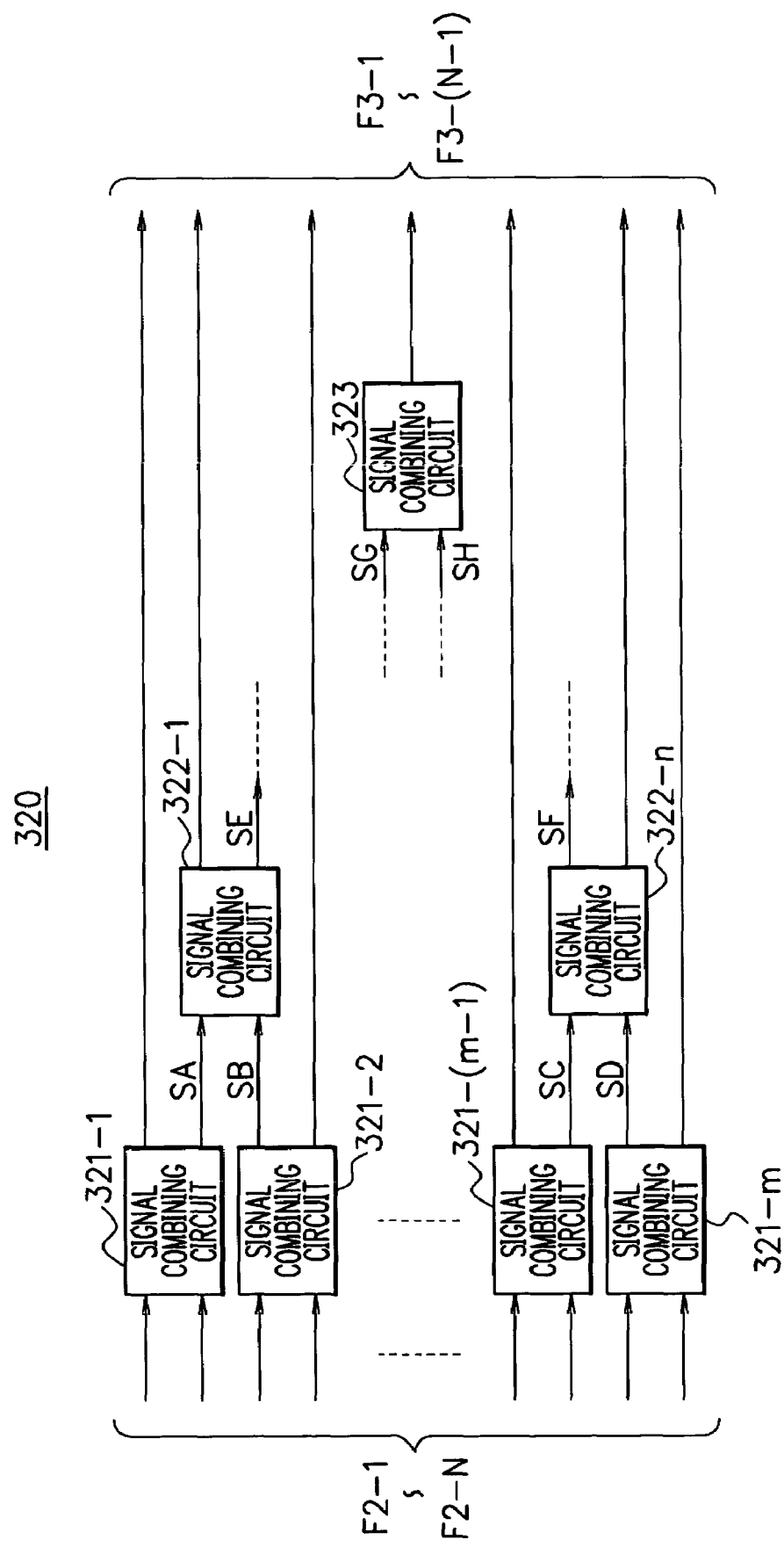
FIG. 6 is a diagram showing a configuration example of a signal combining circuit group.

FIG. 6 is a diagram showing a configuration example of the signal combining circuit group 320.

In FIG. 6, numerals 321-1 to 321-$m$, 322-2 to 322-$n$, and 323 denote signal combining circuits each of which combines inputted two signals by maximum ratio combining or the like and outputs a combined signal. If the number of receiving branches 300-$i$ is taken here as N, m is (N/2), and n is (N/4).

As shown in FIG. 6, the signal combining circuit group 320 includes respective sets of (N/2), (N/4), (N/8), . . . , and one signal combining circuit, outputs of the set of (N/2) signal combining circuits are inputted to the set of (N/4) signal combining circuits, and outputs of the set of (N/4) signal combining circuits are inputted to the set of (N/8) signal combining circuits. Thus, the signal combining circuit group 320 is configured by connecting the signal combining circuits at plural stages in the same manner as above. In other words, if the number of receiving branches included in the receiving device is N, by using (N−1) signal combining circuits in total in such a manner that the number of the signal combining circuits is doubled at each stage from the output side to the input side, the signal combining circuit group 320 can generate combined demodulated signals by optionally combining demodulated signals of the N receiving branches. Incidentally, the signal combining circuits composing the signal combining circuit group 320 may be replaced appropriately with selected signal combining circuits for operation in selection diversity.

For example, as shown in FIG. 6, the signal combining circuits 321-1 to 321-m each combine any two demodulated signals F2-i out of the demodulated signals F2-i outputted by the combining signal input selecting circuit 310 by maximum ratio combining or the like and output a combined demodulated signal. Each of the combined demodulated signals obtained in the signal combining circuits 321-1 to 321-m is outputted as the combined demodulated signal F3-j and outputted to any of the next-stage signal combining circuits 322-1 to 322-n.

More specifically, in the example shown in FIG. 6, the combined demodulated signals obtained in the signal combining circuits 321-1 and 321-2, respectively, are outputted as the combined demodulated signals F3-j and outputted as combined demodulated signals SA and SB to the next-stage signal combining circuit 322-1. Similarly, the combined demodulated signals obtained in the signal combining circuits 321-(m−1) and 321-m, respectively, are outputted as the combined demodulated signals F3-j and outputted as combined demodulated signals SC and SD to the next-stage signal combining circuit 322-n.

Moreover, the signal combining circuits 322-1 to 322-n respectively receive inputs of two combined demodulated signals outputted by the signal combining circuits 321-1 to 321-m, combine these combined demodulated signals by maximum ratio combining or the like, and output combined demodulated signals. Each of the combined demodulated signals obtained in the signal combining circuits 322-1 to 322-n is outputted as the combined demodulated signal F3-j and outputted to any of the next-stage signal combining circuits.

More specifically, in the example shown in FIG. 6, the combined demodulated signal obtained in the signal combining circuit 322-1 is outputted as the combined demodulated signal F3-j and outputted as the combined demodulated signal SE to the next-stage signal combining circuit. Further, the combined demodulated signal obtained in the signal combining circuit 322-n is outputted as the combined demodulated signal F3-j and outputted as the combined demodulated signal SF to the next-stage signal combining circuit.

In the same manner as above, the final stage signal combining circuit 323 receives inputs of combined demodulated signals SG and SH obtained in the preceding stage signal combining circuits and outputs a signal obtained by combining the combined demodulated signals SG and SH as the combined demodulated signal F3-j. This combined demodulated signal outputted from the final stage signal combining circuit 323 corresponds to a signal obtained by combining all of the demodulated signals F2-1 to F2-N.

Incidentally, the configuration of the signal combining circuit group 320 shown in FIG. 6 is one example. The present invention is not limited to this configuration, various modifications may be made therein, and a configuration capable of optionally combining inputted plural demodulated signals and outputting combined demodulated signals is suitable.

In the fifth embodiment of the present invention thus configured, the demodulated signals subjected to signal combination (signal selection) in the signal combining circuit group 320, that is, the demodulated signals F1-i of the receiving branches 300-i controlled so as to obtain demodulated signals of the same channel are selected by the combining signal input selecting circuit 310 and outputted to the signal combining circuit group 320, and the combined demodulated signals obtained by combination in the signal combining circuit group 320 are outputted to the decoding input signal selecting circuit 330. Also, the demodulated signals F1-i of the receiving branches 300-i controlled so as to obtain demodulated signals of channels different from the other receiving branches 300-i are outputted to the decoding input signal selecting circuit 330 by the combining signal input selecting circuit 310.

In the signal combination in the signal combining circuit group 320, in the case of combination of the demodulated signals of only two receiving branches 300-i, an output of the 2-input signal combining circuit 321 is outputted to the decoding input selecting circuit 330. In the case of combination of the demodulated signals of four receiving branches 300-i, outputs of the 2-input signal combining circuits 321 are further combined in the 2-input signal combining circuit 322, and an output thereof is outputted to the decoding input signal selecting circuit 330. Moreover, for example, when six receiving branches 300-i are provided and demodulated signals of each three receiving branches 300-i are combined, it is needed that an input of the signal combining circuit 322 at the second stage from the input side in the signal combining circuit group 320 can be selected.

Then, the combined demodulated signals F3-j obtained in the signal combining circuit group 320 and the demodulated signals F2'-i inputted as they are from the receiving branches 300-i via the combining signal input selecting circuit 310 are selected by the decoding input signal selecting circuit 330 and outputted to the decoding blocks 340-i. Further, the decoded signals obtained by decoding in the decoding blocks 340-i are outputted to the output devices including the decoders connected in the subsequent stage by the output signal selecting circuit 350.

As just described, similarly to the above-described first to fourth embodiment, the fifth embodiment of the present invention includes plural receiving branches 300-i which are independently controllable for use in diversity reception or plural-channel simultaneous reception, so that it can control the number of receiving branches whose demodulate signals are combined and control channels to be received, whereby it can be operated both as a diversity receiving device and as a plural-channel simultaneous receiving device, and can meet multifunctionality such as multi-audio recording, multi-picture recording, or multi-channel screen. For example, when the receiving state is bad, by increasing the number of receiving branches 300-i controlled to obtain demodulated signals of the corresponding channel, a diversity reception effect can be obtained, When the receiving state is good, by decreasing the number of receiving branches 300-i whose signals are combined, plural lines of channels can be received. Incidentally, a channel search related to the received signal may be performed using any one of the plural receiving branches 300-$i$.

Further, in the fifth embodiment, the combining signal input selecting circuit 310 is provided at the stage previous to the signal combining circuit group 320 composed of plural signal combining circuits, and transmission paths of the respective demodulated signals F1-$i$ outputted by the receiving branches 300-$i$ can be optionally switched, so that the demodulated signals F1-$i$ outputted by the receiving branches 300-$i$ can be optionally combined by a small number of signal combining circuits.

Figure 7:
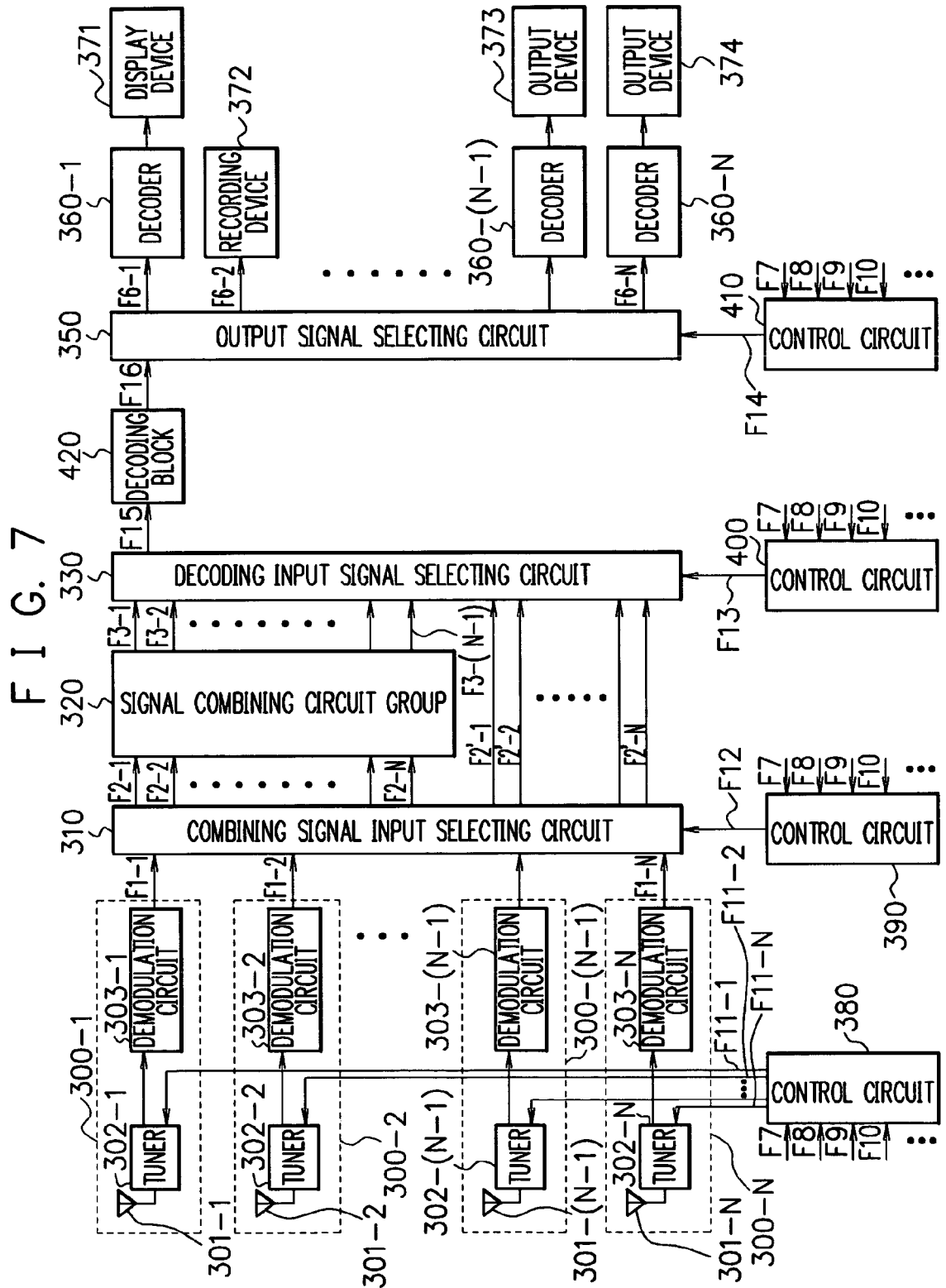
FIG. 7 is a block diagram showing another configuration example of the receiving device according to the fifth embodiment.

FIG. 7 is a block diagram showing another configuration example of the receiving device according to the fifth embodiment. The receiving device shown in FIG. 7 is provided with a decoding block 420 having a different function in place of the decoding blocks 340-$i$ shown in FIG. 5, and in other respects, it is configured in the same manner as the receiving device shown in FIG. 5.

When the decoding input signal selecting circuit 330 selects only one demodulated signal (including the combined demodulated signal) and outputs it as a decoding input signal F15, the decoding block 420 is controlled to operate at the same speed as the decoding blocks 340-$i$ shown in FIG. 5, receive the decoding input signal F15, perform processing such as demapping or deinterleave, and output a decoded signal F16. When the decoding input signal selecting circuit 330 selects a plural number (for example, taken as k, k is a natural number of 2 or more) of demodulates signals and outputs them as the decoding input signal F15, the decoding block 420 is controlled to perform speed control according to inputs of the selected decoded signals, operate at k times the speed of the decoding blocks 340-$i$ shown in FIG. 5, receive the decoding input signal F15, perform processing such as demapping or deinterleave in the time-sharing system, and output the decoded signal F16. Incidentally, the k-fold operation in the decoding block 420 is realized, for example, by supplying a clock with a k-fold cycle to the decoding block 420.

Even if the receiving device is configured as shown in FIG. 7, similarly to the above-described receiving device shown in FIG. 5, the receiving device includes plural receiving branches 300-$i$ which are independently controllable for use in diversity reception or plural-channel simultaneous reception, so that it can be operated both as a diversity receiving device and as a plural-channel simultaneous receiving device and can meet multifunctionality such as multi-audio recording, multi-picture recording, or multi-screen.

Incidentally, in the above description, the decoding block 420 changes the operation speed according to the number of demodulated signals which are selected and outputted as the decoding input signal F15 out of the demodulated signals inputted to the decoding input signal selecting circuit 330, but the decoding block 420 may be operated at a speed multiplied by the total number of demodulated signals which can be inputted as the decoding input signal F15. Further, when the number (output number) of demodulated signals which the decoding block 420 outputs as the decoded signal F16 is previously determined, the decoding block 420 may be operated at a speed multiplied by the output number. Furthermore, when the decoding block 420 is operated at the k-fold speed, it is also possible to allocate a memory inside the decoding block 420 to respective demodulated signals to be decoded which are inputted as the decoding input signal F15 and perform processing such as demapping or deinterleave.

A concrete example of the receiving device according to the fifth embodiment will be described below.

Figure 8:
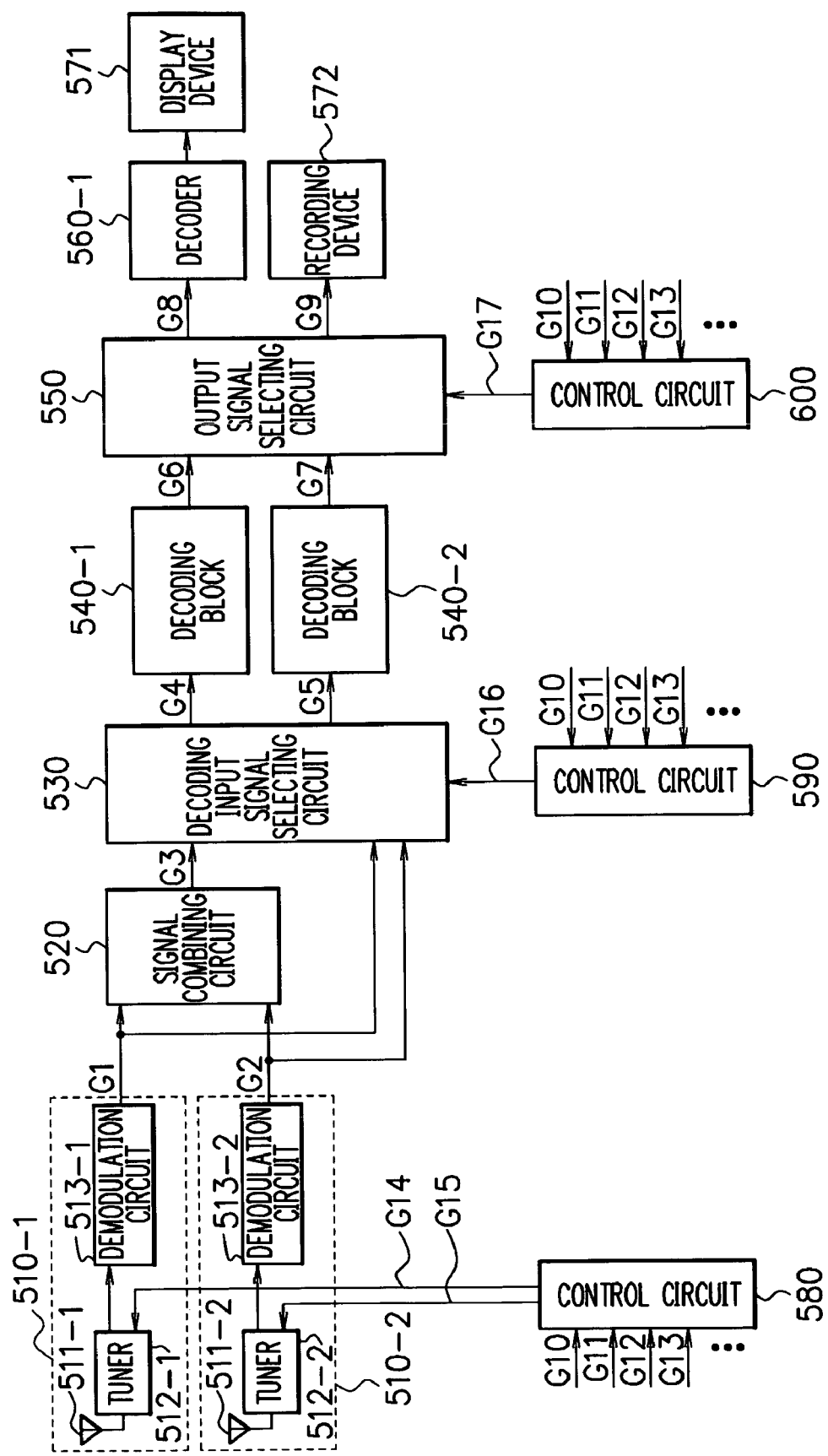
FIG. 8 is a block diagram showing a concrete example of the receiving device according to the fifth embodiment.

FIG. 8 is a block diagram showing the concrete example of the receiving device according to the fifth embodiment, and shows a receiving device including two receiving branches 510-1 and 510-2 as an example.

In a receiving branch 510-1, numeral 511-1 denotes an antenna, numeral 512-1 denotes a tuner, and numeral 513-1 denotes a demodulation circuit, and they correspond to the antenna 301-$i$, the tuner 302-$i$, and the demodulation circuit 303-$i$ shown in FIG. 5, respectively. Similarly, in a receiving branch 510-2, numeral 511-2 denotes an antenna, numeral 512-2 denotes a tuner, and numeral 513-2 denotes a demodulation circuit, and they correspond to the antenna 301-$i$, the tuner 302-$i$, and the demodulation circuit 303-$i$ shown in FIG. 5, respectively.

Numeral 520 denotes a signal combining circuit which combines a demodulated signal G1 of the receiving branch 510-1 outputted by the demodulation circuit 513-1 and a demodulated signal G2 of the receiving branch 510-2 outputted by the demodulation circuit 513-2 by maximum ratio combining or the like and outputs a combined demodulated signal G3. When the number of receiving branches included in the receiving device here is two as shown in FIG. 8, transmission paths of signals are fixed and hence it is not necessary to cope with plural signal transmission paths, so that the combining signal input selecting circuit and the control circuit to control the same are not provided.

Numeral 530 denotes a decoding input signal selecting circuit which receives the combined demodulated signal G3 outputted by the signal combining circuit 520, the demodulated signal G1 outputted by the demodulation circuit 513-1, and the demodulated signal G2 outputted by the demodulation circuit 513-2, and selects a decoding input signal to be inputted to a next-stage decoding block.

Numeral 540-1 denotes a decoding block which receives a decoding input signal G4 outputted by the decoding input signal selecting circuit 530, performs processing such as demapping or deinterleave, and outputs a decoded signal G6 being an encoded data stream. Numeral 540-2 denotes a decoding block which receives a decoding input signal G5 outputted by the decoding input signal selecting circuit 530, performs processing such as demapping or deinterleave, and outputs a decoded signal G7 being an encoded data stream.

Numeral 550 denotes an output signal selecting circuit which receives the decoded signals G6 and G7 outputted by the decoding blocks 540-1 and 540-2 and selects a decoded signal to be inputted to a next-stage decoder or the like. Incidentally, when selecting the decoded signal to be inputted to the next-stage output device, the output signal selecting circuit 550 can perform selection control for outputting the selected decoded signal as either of output signals G8 and G9.

Numeral 560-1 denotes a decoder (for example, an MPEG decoder) which receives the output signal G8 of the output signal selecting circuit 550 and performs decoding corresponding to an encoding format of the output signal G8. Numeral 571 denotes a display device being an output device to which a decoded signal (a picture signal, an audio signal) outputted by the decoder 560-1 is supplied. Numeral 572 denotes a recording device which the output signal G9 of the output signal selecting circuit 550 is inputted to and recorded on.

Numeral 580 denotes a control circuit which supplies station selection control signals G14 and G15 to the tuners 512-1 and 512-2 to control station selection operations of the tuners 512-1 and 512-2. Numeral 590 denotes a control circuit which supplies a decoding input signal selection control signal G16 to the decoding input signal selecting circuit 530 to control a decoding input signal selection operation of the decoding input signal selecting circuit 530. Numeral 600 denotes a control circuit which supplies an output signal selection control signal G17 to the output signal selecting circuit 550 to control an output signal selection operation of the output signal selecting circuit 550.

Here, the control circuits 580, 590, and 600 performs control with, out of an error rate signal G10, an AGC level signal G11, a priority signal G12, a user switching signal G13, and a receiving state signal, one or more signals, for example, the error rate signal G10, the AGC level signal G11, the priority signal G12, and the user switching signal G13 as judgment signals.

According to such a configuration as shown in FIG. 8, for example, by performing control in such manner that the receiving branches 510-1 and 510-2 obtain demodulated signals of the same channel, the decoding input signal selecting circuit 530 selects the combined demodulated signal G3 outputted by the signal combining circuit 520 as the decoding input signal G4, and the output signal selecting circuit 550 selects and outputs the decoded signal G6 outputted by the decoding block 540-1, it is possible to use the receiving branches 510-1 and 510-2 for diversity reception and operate the receiving device as a diversity receiving device. The contents received by the receiving branches 510-1 and 510-2 can be displayed on the display device 571 or recorded on the recording device 572.

On the other hand, for example, by performing control in such a manner that the receiving branches 510-1 and 510-2 obtain demodulated signals of different channels, the decoding input signal selecting circuit 530 selects the demodulated signals G1 and G2 outputted by the demodulation circuits 513-1 and 513-2 as the decoding input signals G4 and G5, and the output signal selecting circuit 550 selects and outputs the decoded signals G6 and G7 outputted by the decoding blocks 540-1 and 540-2, it is possible to use the receiving branches 510-1 and 510-2 for 2-channel simultaneous reception and operate the receiving device as a 2-channel simultaneous receiving device. Then, for example, the contents received by the receiving branch 510-1 can be displayed on the display device 571, and the contents received by the receiving branch 510-2 can be recorded on the recording device 572. Further, for example, the contents received by the receiving branch 510-1 can be recorded on the recording device 572, and the contents received by the receiving branch 510-2 can be displayed on the display device 571.

Figure 9:
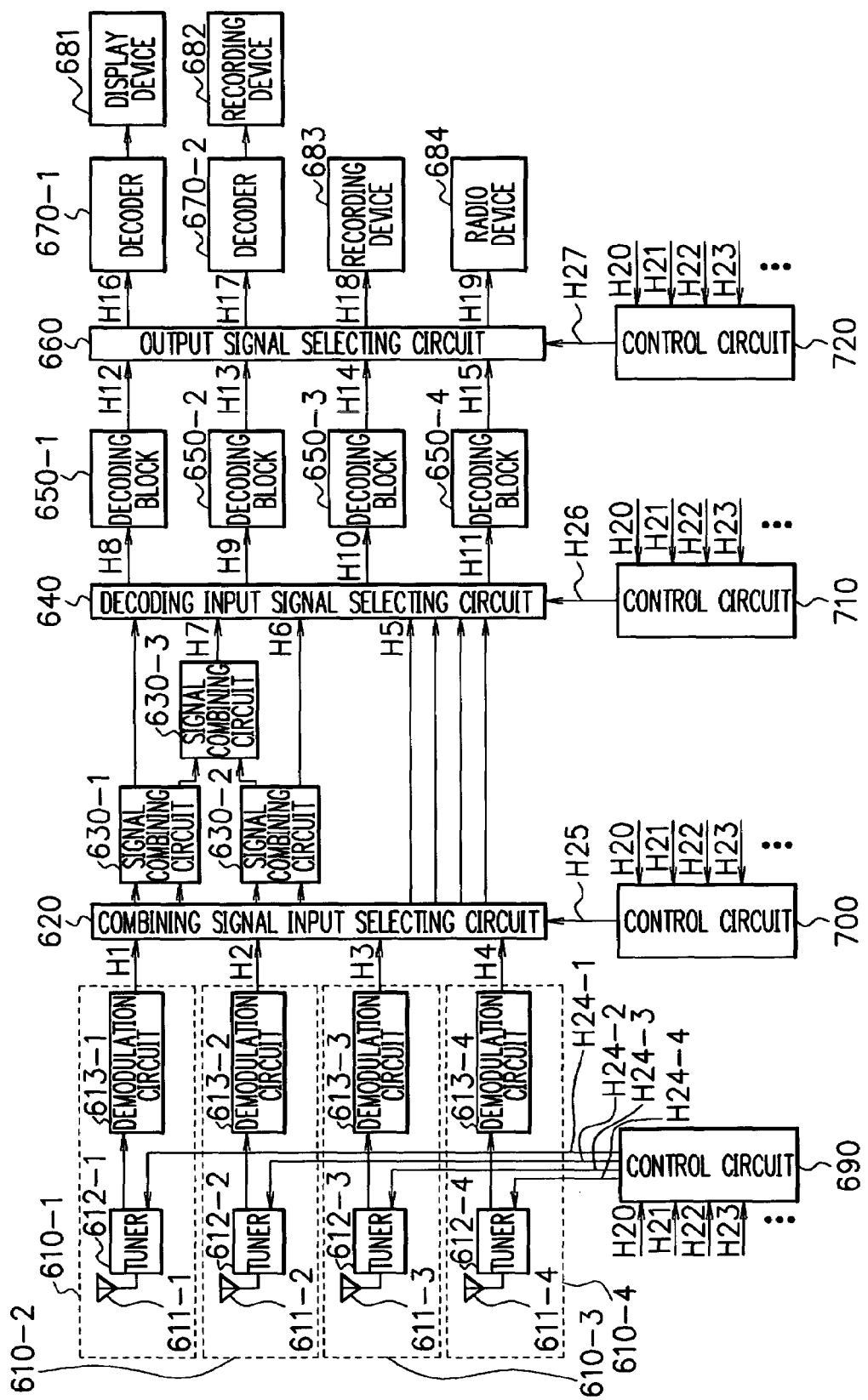
FIG. 9 is a block diagram showing another concrete example of the receiving device according to the fifth embodiment.
Figure 10:
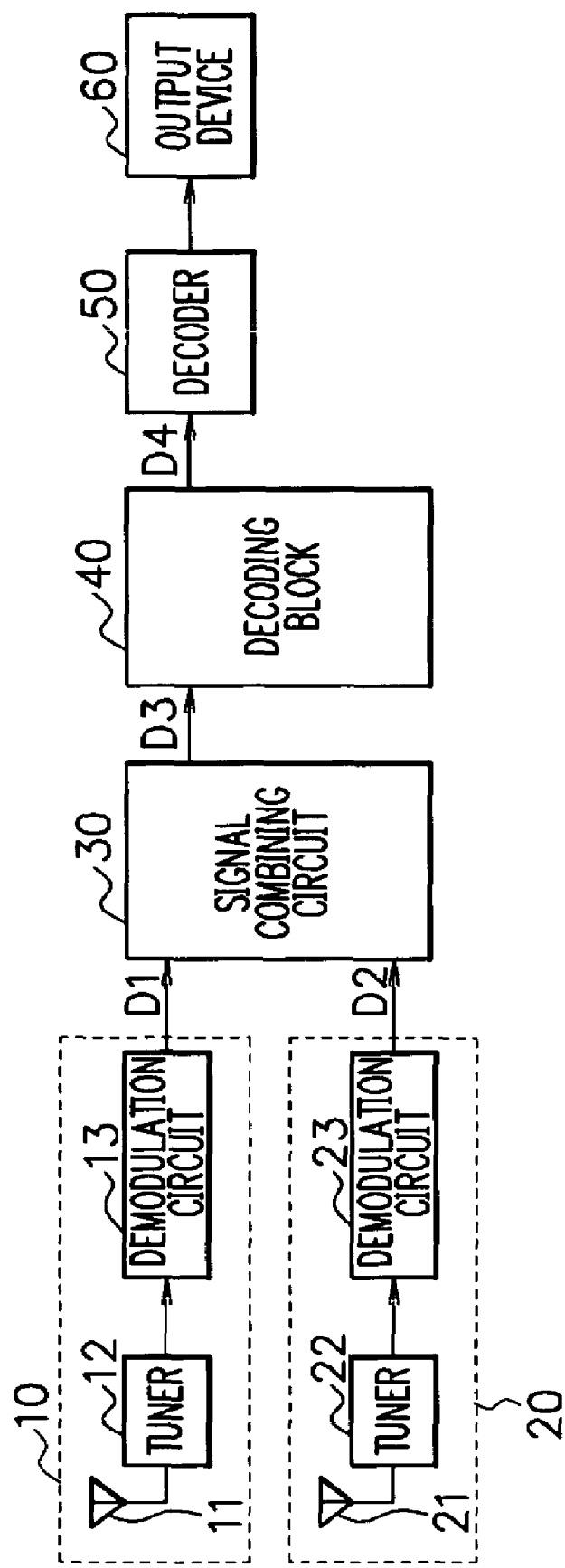
FIG. 10 is a block diagram showing a configuration example of a conventional receiving device.

FIG. 9 is a block diagram showing another concrete example of the receiving device according to the fifth embodiment, and shows a receiving device including four receiving branches 610-*p* (p is a subscript, p=1, 2, 3, 4) as an example.

In the receiving branch 610-*p*, numeral 611-*p* denotes an antenna, numeral 612-*p* denotes a tuner, and numeral 613-*p* denotes a demodulation circuit, and they correspond to the antenna 301-*i*, the tuner 302-*i*, and the demodulation circuit 303-*i* shown in FIG. 5, respectively.

Numeral 620 denotes a combining signal input selecting circuit which receives demodulated signals H1, H2, H3, and H4 of the receiving branches 610-*p* outputted by the demodulation circuits 613-*p* and can selectively switch demodulated signals to be inputted to next-stage signal combining circuits 630-1 and 630-2 and a decoding input signal selecting circuit 640.

Numerals 630-1 and 630-2 each denote a signal combining circuit which combines any two demodulated signals out of the demodulated signals H1, H2, H3, and H4 of the receiving branches 610-*p* outputted by the demodulation circuits 613-*p* by maximum ratio combining or the like and outputs a combined demodulated signal. Here, the demodulated signals H1, H2, H3, and H4 inputted to the signal combining circuits 630-1 and 630-2 are different from one another. Numeral 630-3 denotes a signal combining circuit which combines combined demodulated signals outputted by the signal combining circuits 630-1 and 630-2 by maximum ratio combining or the like and outputs a combined demodulated signal.

Numeral 640 denotes a decoding input signal selecting circuit which receives demodulated signals H5, H6, and H7 outputted by the combining signal input selecting circuit 620 and the signal combining circuits 630-1, 630-2, and 630-3 and selects decoding input signals to be inputted to next-stage decoding blocks.

Numeral 650-*p* denotes decoding blocks which respectively receive decoding input signals H8, H9, H10, and H11 outputted by the decoding input signal selecting circuit 640, perform processing such as demapping or deinterleave, and output decoded signals each being an encoded data stream.

Numeral 660 denotes an output signal selecting circuit which receives decoded signals H12, H13, H14, and H15 outputted by the decoding blocks 650-*p* and selects a decoded signal to be outputted to a next-stage decoder or the like. Here, when selecting the decoded signal to be outputted to the next-stage output device, the output signal selecting circuit 660 can perform selection control for outputting the selected decoded signal as any of output signals H16, H17, H18, and H19.

Numerals 670-1 and 670-2 denote decoders (for example, MPEG decoders) which receive the output signals H16 and H17 of the output signal selecting circuit 660 and perform decoding corresponding to encoding formats of the output signals H16 and H17. Numeral 681 denotes a display device being an output device to which a decoded signal (a picture signal, an audio signal) outputted by the decoder 670-1 is supplied. Numeral 682 denotes a recording device to which a decoded signal (a picture signal, an audio signal) outputted by the decoder 670-2 is supplied. Numeral 683 denotes a recording device which receives the signal decoded by the decoding block and supplied as the output signal H18 of the output signal selecting circuit 660 as it is and records it. Numeral 684 denotes a radio device which receives the signal decoded by the decoding block and supplied as the output signal H19 of the output signal selecting circuit 660 as it is and transmits it by radio.

Numeral 690 denotes a control circuit which supplies station selection control signals H24-*p* to the tuners 612-*p* to control station selection operations of the tuners 612-*p*. Numeral 700 denotes a control circuit which supplies a demodulated signal selection control signal H25 to the combining signal input selecting circuit 620 to control a demodulated signal selection operation of the combining signal input selecting circuit 620. Numeral 710 denotes a control circuit which supplies a decoding input signal selection control signal H26 to the decoding input signal selecting circuit 640 to control a decoding input signal selection operation of the decoding input signal selecting circuit 640. Numeral 720 denotes a control circuit which supplies an output signal selection control signal H27 to the output signal selecting circuit 660 to control an output signal selection operation of the output signal selecting circuit 660.

The control circuits 690, 700, 710, and 720 each perform control with, out of an error rate signal H20, an AGC level signal H21, a priority signal H22, a user switching signal H23, and a receiving state signal, one or more signals, for example, the error rate signal H20, the AGC level signal H21, the priority signal H22, and the user switching signal H23 as judgment signals.

According to such a configuration as shown in FIG. 9, for example, out of four receiving branches 610-*p*, some plural receiving branches 610-*p* are controlled to obtain demodulated signals of the same channel, and the remaining receiving branches 610-*p* different therefrom are controlled to obtain demodulated signals of different channels. By controlling transmission paths of the demodulated signals by the combining signal input selecting circuit 620, the demodulated signals outputted by the receiving branches 610-*p* which are controlled to obtain the demodulated signals of the same channel are inputted to the signal combining circuits, and the demodulated signals outputted by the receiving branches 610-*p* which are controlled to obtain the demodulated signals of different channels are inputted as they are to the decoding input signal selecting circuit. Then, the combined demodulated signals H6 and H7 combined in the signal combining circuits and the demodulated signal H5 related to the different channel are selectively outputted to the decoding blocks 650-*p* by the decoding input signal selecting circuit. Consequently, by including the plural receiving branches 610-*p* which are independently controllable for use in diversity reception or plural-channel simultaneous reception, the receiving device can be operated both as a diversity receiving device and as a plural-channel simultaneous receiving device and can meet multifunctionality such as multi-audio recording, multi-picture recording, or multi-screen.

Incidentally, in the receiving devices according to the above-described embodiments, both the decoding input signal selecting circuit which selects the decoding input signal to be inputted to the decoding block and the output signal selecting circuit which selects the decoded signal outputted by the decoding block in order to output it to the next-stage decoder or the like are provided, but the output signal selecting circuit may not be provided. In this case, signal transmission switching realized by the decoding input signal selecting circuit and the output signal selecting circuit when these two selecting circuits are both provided needs to be realized only by the decoding input signal selecting circuit.

The present embodiments are to be considered in all respects as illustrative and no restrictive, and all changes which come within the meaning and range of equivalency of the claims are therefore intended to be embraced therein. The invention may be embodied in other specific forms without departing from the spirit or essential characteristics thereof.

According to the present invention, a receiving device includes plural receiving branches which are controllable for use in diversity reception or plural-channel simultaneous reception, so that it can be operated both as a diversity receiving device and as a plural-channel simultaneous receiving device, and can meet multifunctionality such as multi-audio recording, multi-picture recording, or multi-screen.

What is claimed is:

1. A receiving device, comprising
   plural receiving branches being controllable for use in diversity reception or plural-channel simultaneous reception, wherein,
   when using the diversity reception, said plural receiving branches receive signals of a same channel, and
   when using the plural-channel simultaneous reception, said plural receiving branches receive signals of a plurality of different channels simultaneously.

2. The receiving device according to claim 1, further comprising
   a first control circuit controlling respective receiving channels of said plural receiving branches.

3. The receiving device according to claim 2, wherein
   said first control circuit has a function of switching the respective receiving channels of said plural receiving branches with one or more of a switching signal by a user, a receiving state signal, an AGO level signal, an error rate signal, and a priority signal related to an output device as judgment signals.

4. The receiving device according to claim 1, further comprising:
   a signal combining circuit diversity-combining plural demodulated signals outputted by said plural receiving branches; and
   a first selecting circuit receiving a demodulated signal outputted by said signal combining circuit and the demodulated signals outputted by said plural receiving branches and selecting one or more demodulated signals.

5. The receiving device according to claim 4, further comprising
   one or more selected signal combining circuits diversity-combining plural demodulated signals outputted by plural receiving branches which are part of said plural receiving branches, wherein
   said first selecting circuit receives the demodulated signal outputted by said signal combining circuit, one or more demodulated signals outputted by said one or more selected signal combining circuits, and the plural demodulated signals outputted by said plural receiving branches, and selects one or more demodulated signals.

6. The receiving device according to claim 4, further comprising
   a second control circuit controlling a selection operation of said first selecting circuit with one or more of a switching signal by a user, a receiving state signal, an AGC level signal, an error rate signal, and a priority signal related to an output device as judgment signals.

7. The receiving device according to claim 4, further comprising
   plural decoding blocks being provided corresponding to plural demodulated signals outputted by said first selecting circuit and decoding the plural demodulated signals.

8. The receiving device according to claim 7, further comprising
   a second selecting circuit receiving plural decoded signals outputted by said plural decoding blocks and selecting one or more decoded signals.

9. The receiving device according to claim 8, further comprising
   a third control circuit controlling a selection operation of said second selecting circuit with one or more of a switching signal by a user, a receiving state signal, an AGC level signal, an error rate signal, and a priority signal related to an output device as judgment signals.

10. The receiving device according to claim 4, further comprising
    a decoding block decoding plural demodulated signals outputted by said first selecting circuit, wherein
    said decoding block is operated at a speed which is k (K>1) times a speed when decoding blocks are respectively provided corresponding to demodulated signals and each decoding block decodes one demodulated signal.

11. The receiving device according to claim 10, further comprising
    a second selecting circuit receiving plural decoded signals outputted by said decoding block and selecting one or more decoded signals.

12. The receiving device according to claim 11, further comprising
    a third control circuit controlling a selection operation of said second selecting circuit with one or more of a switching signal by a user, a receiving state signal, an AGC level signal, an error rate signal, and a priority signal related to an output device as judgment signals.

13. The receiving device according to claim 4, further comprising
    a decoding block being allowed to decode plural demodulated signals outputted by said first selecting circuit in a time-sharing system.

14. The receiving device according to claim 4, further comprising
    a decoding block decoding plural demodulated signals outputted by said first selecting circuit, wherein
    a memory of said decoding block is allocated to said respective demodulated signals to decode the plural demodulated signals.

15. The receiving device according to claim 8, further comprising a decoder receiving an output signal of said second selecting circuit and performing to decode the output signal corresponding to an encoding format of the output signal.

16. The receiving device according to claim 4, further comprising a third selecting circuit receiving the plural demodulated signals outputted by said plural receiving branches and selectively outputting the demodulated signal to said signal combining circuit or said first selecting circuit.

17. The receiving device according to claim 16, further comprising a fourth control circuit controlling a selection operation of said third selecting circuit with one or more of a switching signal by a user, a receiving state signal, an AGC level signal, an error rate signal, and a priority signal related to an output device as judgment signals.

18. The receiving device according to claim 8, further comprising at least either a function of recording a demodulated picture signal related to a decoded signal outputted by said second selecting circuit or a function of recording a demodulated audio signal related thereto.

* * * * *

UNITED STATES PATENT AND TRADEMARK OFFICE
CERTIFICATE OF CORRECTION

PATENT NO.       : 7,660,375 B2                                           Page 1 of 1
APPLICATION NO.  : 11/362090
DATED            : February 9, 2010
INVENTOR(S)      : Nagata et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 905 days.

Signed and Sealed this

Twenty-eighth Day of December, 2010

David J. Kappos
*Director of the United States Patent and Trademark Office*